(12) United States Patent
Gaal et al.

(10) Patent No.: US 11,552,768 B2
(45) Date of Patent: Jan. 10, 2023

(54) TECHNIQUES FOR HYBRID AUTOMATIC REPEAT REQUEST (HARQ) PROCESSES FOR MULTIPLE CARRIERS IN DIFFERENT FREQUENCY RANGES FOR CARRIER AGGREGATION (CA)

(71) Applicant: QUALCOMM Incorporated, San Diego, CA (US)

(72) Inventors: Peter Gaal, San Diego, CA (US); Yi Huang, San Diego, CA (US); Tingfang Ji, San Diego, CA (US); Wanshi Chen, San Diego, CA (US); Joseph Binamira Soriaga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 135 days.

(21) Appl. No.: 16/928,878

(22) Filed: Jul. 14, 2020

(65) Prior Publication Data

US 2021/0028909 A1    Jan. 28, 2021

Related U.S. Application Data

(60) Provisional application No. 62/877,276, filed on Jul. 22, 2019.

(51) Int. Cl.
*H04L 5/00* (2006.01)
*H04L 27/26* (2006.01)
*H04L 5/22* (2006.01)

(52) U.S. Cl.
CPC ............ *H04L 5/0055* (2013.01); *H04L 5/001* (2013.01); *H04L 5/0037* (2013.01); *H04L 5/22* (2013.01); *H04L 27/2604* (2013.01)

(58) Field of Classification Search
CPC .............................. H04L 5/0055; H04L 5/001
See application file for complete search history.

(56) References Cited

U.S. PATENT DOCUMENTS

2020/0235891 A1* 7/2020 Lei ..................... H04L 1/1864

FOREIGN PATENT DOCUMENTS

WO        2018175820 A1    9/2018
WO    WO-2020125990 A1 *  6/2020    ........... H04L 1/1861

OTHER PUBLICATIONS

International Search Report and Written Opinion—PCT/US2020/042073—ISA/EPO—dated Oct. 20, 2020.
(Continued)

*Primary Examiner* — Hoon J Chung
(74) *Attorney, Agent, or Firm* — Patterson+ Sheridan, L.L.P.

(57) ABSTRACT

Techniques and apparatus for transmitting control information to maintain hybrid automatic repeat request (HARQ) processes for multiple carriers in different frequency ranges, such as frequency range 1 (FR1) and frequency range 2 (FR2), in carrier aggregation scenarios are described. A first numerology of a first component carrier (CC) in FR1 and a second numerology of a second CC in FR2 are determined. A HARQ configuration that includes an indication of a set of physical uplink control channel (PUCCH) resources is determined. A number of symbols of the set of PUCCH resources is based on the first numerology and the second numerology. The HARQ configuration is transmitted to a user equipment (UE). HARQ feedback is transmitted on the first CC for data received on the second CC, using the set of PUCCH resources of the HARQ configuration.

30 Claims, 10 Drawing Sheets

(56) References Cited

OTHER PUBLICATIONS

NTT Docomo: "Status Report for RAN WG1 to TSG-RAN #74", 3GPP Draft, RP-161937, RAN1 SR RAN #74, 3rd Generation Partnership Project (3GPP), Mobile Competence Centre, 650, Route Des Lucioles, F-06921 Sophia-Antipolis Cedex, France, vol. TSG RAN, No. Vienna, Austria, Dec. 5, 2016-Dec. 8, 2016, Dec. 6, 2016 (Dec. 6, 2016), XP051183884, 42 Pages, Retrieved from the Internet: URL: http://www.3gpp.org/ftp/Meetings_3GPP_SYNC/RAN/Docs/ [retrieved on Dec. 6, 2016] p. 27.

\* cited by examiner

TECHNIQUES FOR HYBRID AUTOMATIC REPEAT REQUEST (HARQ) PROCESSES FOR MULTIPLE CARRIERS IN DIFFERENT FREQUENCY RANGES FOR CARRIER AGGREGATION (CA)

CROSS-REFERENCE TO RELATED APPLICATION

This application claims the benefit of and priority to U.S. Provisional Patent Application Ser. No. 62/877,276, filed Jul. 22, 2019, which is assigned to the assignee hereof and hereby expressly incorporated by reference herein.

BACKGROUND

I. Field of the Disclosure

Aspects of the present disclosure relate to wireless communications and, more particularly, to improved techniques for hybrid automatic repeat request (HARQ) processes.

II. Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

As the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include use of HARQ processes when communicating.

Certain aspects provide a method for wireless communication that may be performed by a network entity. The method generally includes identifying a carrier aggregation (CA) configuration in which at least a first component carrier (CC) in a first frequency range is aggregated with at least a second CC in a second frequency range. The method also includes determining a first numerology of the first CC and a second numerology of the second CC. The method further includes determining a hybrid automatic repeat request (HARQ) configuration comprising an indication of a set of physical uplink control channel (PUCCH) resources. A number of symbols of the set of PUCCH resources is based at least in part on the first numerology and the second numerology. The method further includes transmitting the HARQ configuration.

Certain aspects provide an apparatus for wireless communication. The apparatus generally includes at least one processor, a transmitter, and a memory coupled to the at least one processor. The at least one processor is configured to identify a carrier aggregation (CA) configuration in which at least a first component carrier (CC) in a first frequency range is aggregated with at least a second CC in a second frequency range, determine a first numerology of the first CC and a second numerology of the second CC, and determine a hybrid automatic repeat request (HARQ) configuration comprising an indication of a set of physical uplink control channel (PUCCH) resources, wherein a number of symbols of the set of PUCCH resources is based at least in part on the first numerology and the second numerology. The transmitter is configured to transmit the HARQ configuration.

Certain aspects provide an apparatus for wireless communication. The apparatus generally includes means for identifying a carrier aggregation (CA) configuration in which at least a first component carrier (CC) in a first frequency range is aggregated with at least a second CC in a second frequency range, means for determining a first numerology of the first CC and a second numerology of the second CC, means for determining a hybrid automatic repeat request (HARQ) configuration comprising an indication of a set of physical uplink control channel (PUCCH) resources, wherein a number of symbols of the set of PUCCH resources is based at least in part on the first numerology and the second numerology, and means for transmitting the HARQ configuration.

Certain aspects provide a computer-readable medium having computer executable code stored thereon for wireless communication by an apparatus. The computer executable code generally includes code for identifying a carrier aggregation (CA) configuration in which at least a first component carrier (CC) in a first frequency range is aggregated with at least a second CC in a second frequency range, code for determining a first numerology of the first CC and a second numerology of the second CC, code for determining a hybrid automatic repeat request (HARQ) configuration comprising an indication of a set of physical uplink control channel (PUCCH) resources, wherein a number of symbols of the set of PUCCH resources is based at least in part on the first numerology and the second numerology, and code for transmitting the HARQ configuration.

Certain aspects provide a method for wireless communication that may be performed by a user equipment (UE). The method generally includes identifying a carrier aggregation (CA) configuration in which at least a first component carrier (CC) in a first frequency range is aggregated with at least a second CC in a second frequency range. The method also includes determining a first numerology of the first CC and a second numerology of the second CC. The method further includes receiving a hybrid automatic repeat request (HARQ) configuration comprising an indication of a set of physical uplink control channel (PUCCH) resources. A number of symbols of the set of PUCCH resources is based at least in part on the first numerology and the second numerology. The method further yet includes receiving data on the second CC and transmitting HARQ feedback for the data on the first CC using the set of PUCCH resources of the HARQ configuration.

Certain aspects provide an apparatus for wireless communication. The apparatus generally includes at least one processor, a receiver, a transmitter, and a memory coupled to the at least one processor. The at least one processor is configured to identify a carrier aggregation (CA) configuration in which at least a first component carrier (CC) in a first frequency range is aggregated with at least a second CC in a second frequency range, and determine a first numerology of the first CC and a second numerology of the second CC. The receiver is configured to receive a hybrid automatic repeat request (HARQ) configuration comprising an indication of a set of physical uplink control channel (PUCCH) resources, wherein a number of symbols of the set of PUCCH resources is based at least in part on the first numerology and the second numerology, and receive data on the second CC. The transmitter is configured to transmit HARQ feedback for the data on the first CC using the set of PUCCH resources of the HARQ configuration.

Certain aspects provide an apparatus for wireless communication. The apparatus generally includes means for identifying a carrier aggregation (CA) configuration in which at least a first component carrier (CC) in a first frequency range is aggregated with at least a second CC in a second frequency range. The apparatus also includes means for determining a first numerology of the first CC and a second numerology of the second CC. The apparatus further includes means for receiving a hybrid automatic repeat request (HARQ) configuration comprising an indication of a set of physical uplink control channel (PUCCH) resources. A number of symbols of the set of PUCCH resources is based at least in part on the first numerology and the second numerology. The apparatus further yet includes means for receiving data on the second CC and means for transmitting HARQ feedback for the data on the first CC using the set of PUCCH resources of the HARQ configuration.

Certain aspects provide a computer-readable medium having computer executable code stored thereon for wireless communication by an apparatus. The computer executable code generally includes code for identifying a carrier aggregation (CA) configuration in which at least a first component carrier (CC) in a first frequency range is aggregated with at least a second CC in a second frequency range. The computer executable code also includes code for determining a first numerology of the first CC and a second numerology of the second CC. The computer executable code further includes code for receiving a hybrid automatic repeat request (HARQ) configuration comprising an indication of a set of physical uplink control channel (PUCCH) resources. A number of symbols of the set of PUCCH resources is based at least in part on the first numerology and the second numerology. The computer executable code further yet includes code for receiving data on the second CC and code for transmitting HARQ feedback for the data on the first CC using the set of PUCCH resources of the HARQ configuration.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
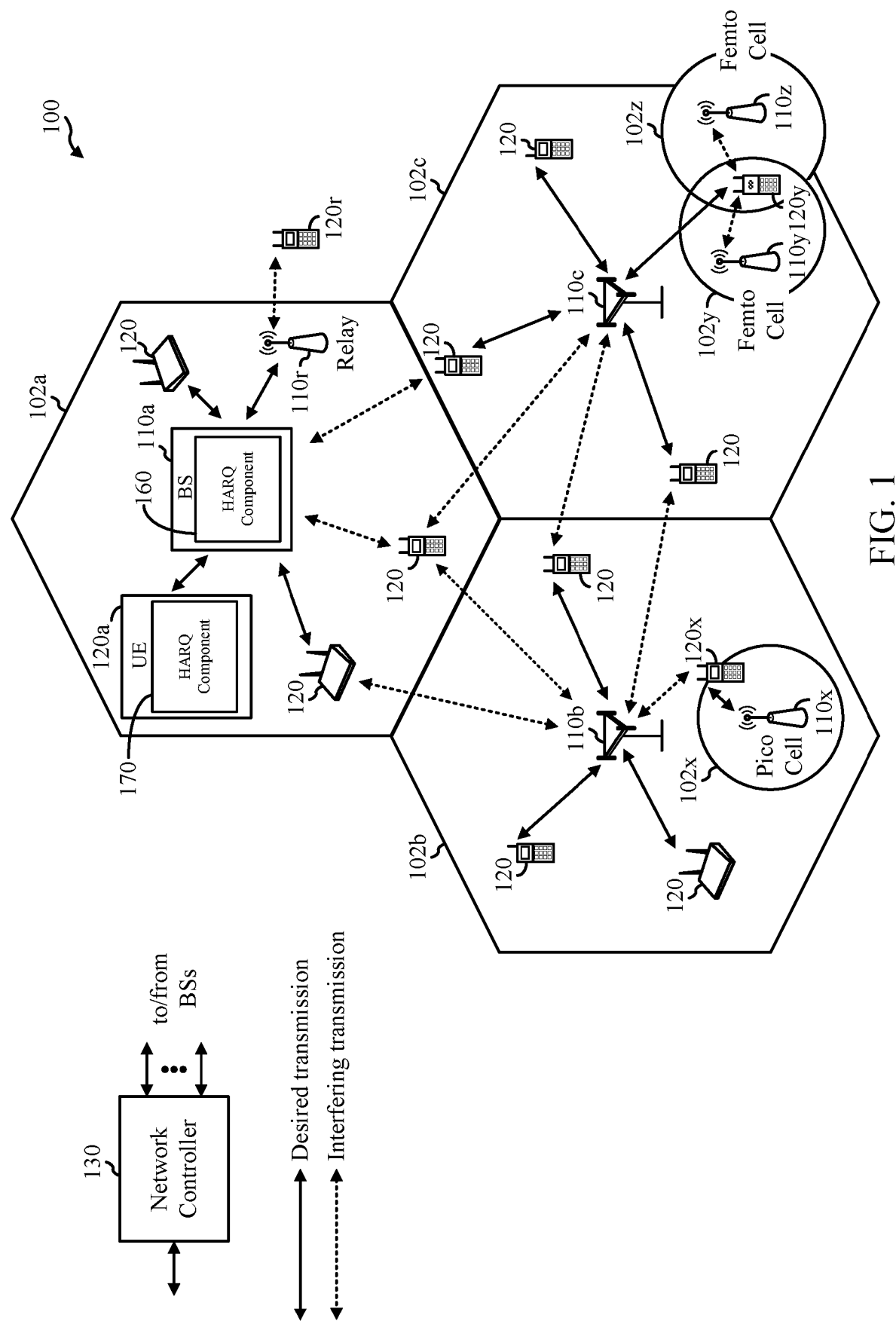
FIG. 1 is a block diagram conceptually illustrating an example telecommunications system, in accordance with certain aspects of the present disclosure.

Aspects of the present disclosure provide apparatus, methods, processing systems, and computer readable mediums for maintaining HARQ processes below a supported number of HARQ processes (e.g., for 5G NR) in NR multiple carriers over different frequency ranges (e.g., FR1 and FR2) in carrier aggregation scenarios. Though certain aspects are described with respect to two carriers over two different frequency ranges, it should be noted that the aspects herein may be applied to any number of plurality of carriers using any number of plurality of frequency ranges.

Certain systems (e.g., 5G NR) may support communications in operating bands located in different frequency ranges (FRs). For example, NR may support one or more operating bands in a frequency range 1 (FR1) and one or more operating bands in a frequency range 2 (FR2). FR1 may be approximately between 410 megahertz (MHz) and 7125 MHz and FR2 may be approximately between 24250 MHz and 52600 MHz.

NR may support carrier aggregation (CA) configurations with FR1 operating band(s) and FR2 operating band(s). For example, to support uplink CA with FR1+FR2, one or more component carriers (CCs) (or cells) in FR1 may be combined (or aggregated) with one or more CCs (or cells) in FR2. Each FR1 and FR2 may have a different numerology. As used herein, the term numerology generally refers to a set of parameters that define a structure of time and frequency resources used for communication. Such parameters may include, for example, subcarrier spacing, type of cyclic prefix, and transmission time intervals (TTIs) (e.g., such as subframe or (mini)-slot durations).

In some cases, when CCs are aggregated under FR1+FR2 CA, the different numerologies that are used for the aggregated CCs may cause the number of HARQ processes to exceed a (maximum) number of HARQ processes allowed (or supported) by the communication system. In one reference example CA scenario described in more detail below (with respect to FIGS. 3-4), a FR1 CC and a FR2 CC (with different numerologies) may be configured for downlink and a FR1 CC may be configured for uplink. In this particular CA scenario, the different numerologies (e.g., subcarrier spacing) used for the FR1 and FR2 CCs may result in a number of HARQ processes (e.g., 19 HARQ processes) that exceeds a number of HARQ processes (e.g., 16 HARQ processes) supported by the 5G NR communication system. This, in turn, can impact communications in the network, increasing latency, reducing performance, reducing efficiency, etc.

To address this, aspects provide techniques that allow devices (e.g., gNB and/or UE) to maintain the number of HARQ processes below the supported number of HARQ processes when aggregating CCs in multiple frequency ranges (e.g., FR1 and FR2). In particular, aspects enable a shorter physical uplink control channel (PUCCH) (relative to PUCCH used in conventional 5G NR systems) to be used to transmit HARQ feedback. For example, in one aspect, the UE can be configured to use a PUCCH that spans 6 or 7 symbols, as opposed to a PUCCH that spans 13 or 14 symbols (used in conventional 5G NR systems), to transmit HARQ feedback. In some aspects, the UE can be configured to use a PUCCH that spans 1 or 2 symbols. Enabling devices to use a shorter PUCCH to transmit HARQ feedback can reduce the number of HARQ processes in a given FR1+FR2 CA scenario. This, in turn, enables devices to maintain the number of HARQ processes below the supported number of HARQ processes when aggregating CCs in multiple frequency ranges.

The following description provides examples of particular carrier aggregation scenarios of cells in FR1 and FR2 in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

As illustrated, BS 110a (e.g., network entity or network node, such as a gNB) includes a HARQ component 160, which is configured to implement one or more techniques described herein for maintaining a number of HARQ processes below a supported number of HARQ processes. Using the HARQ component 160, the BS 110a may determine a HARQ configuration for transmitting HARQ feedback. The BS 110a may determine the HARQ configuration for scenarios in which at least a first CC (or cell) in a first frequency range (e.g., FR1) is aggregated with at least a second CC (or cell) in a second frequency range (e.g., FR2). The BS 110a may transmit data to a UE (e.g., UE 120a) on the second CC. The HARQ configuration may include an indication of a set of PUCCH resources (spanning a reduced number of symbols, such as 1, 2, 6, or 7 symbols) for the UE to use for transmitting HARQ feedback, e.g., on the first CC. The BS 110a may signal (or transmit) the HARQ configuration to a UE (e.g., UE 120a).

In some aspects, using the HARQ component 160, the BS 110a may determine a HARQ configuration for plurality of UE groups, each group comprising one or more UEs. The HARQ configuration may configure each UE group to use a set of reduced PUCCH resources (e.g., spanning 1, 2, 6, or 7 symbols) in a single slot (e.g., in the FR1 cell) for transmitting HARQ feedback. Using the HARQ component 160, the BS 110a may schedule each UE group to use their respective configured PUCCH resources at different times (e.g., using time division multiplexing (TDM)). For example, BS 110a may schedule a first UE (in a first UE group) to use configured PUCCH resources in a first half slot (of a first NR slot) of a first CC in FR1 and schedule a second UE (in a second UE group) to use configured PUCCH resources in a second half slot (of the first NR slot) of the first CC in FR1.

As also illustrated, UE 120a includes a HARQ component 170, which is configured to implement one or more techniques described herein for maintaining a number of HARQ processes below a supported number of HARQ processes. Using the HARQ component 170, the UE 120a may receive a HARQ configuration for transmitting HARQ feedback. The HARQ configuration may include an indication of a set of PUCCH resources (spanning 1, 2, 6, or 7 symbols) for the UE to use for transmitting HARQ feedback in scenarios in which at least a first CC (or cell) in a first frequency range (e.g., FR1) is aggregated with at least a second CC (or cell) in a second frequency range (e.g., FR2). The UE 120a, for example, may receive data on the second CC and may use the reduced PUCCH resources to transmit HARQ feedback on the first CC.

In some aspects, using the HARQ component 170, the UE 120a may receive an indication of a set of reduced PUCCH resources configured for a UE group that the UE 120a is associated with. The UE 120a may receive an indication (e.g., from a gNB, such as BS 110a) scheduling (or triggering) the UE 120a to use the reduced PUCCH resources at a particular time (e.g., first or second half slot of a NR slot of the first CC in FR1).

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
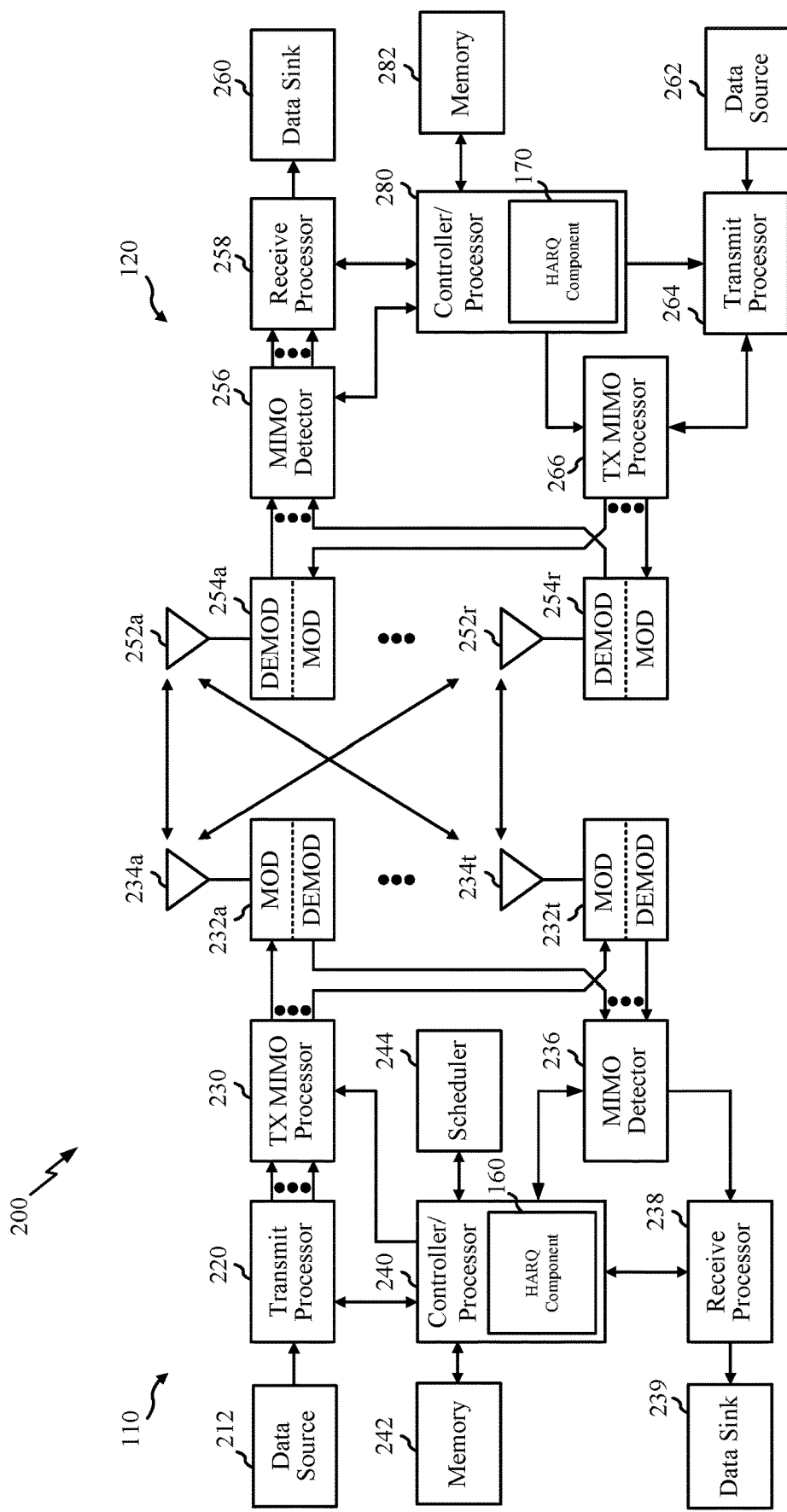
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 240 and/or other processors and modules at the BS 110a may perform or direct the execution of processes for the techniques described herein. For example, as shown in FIG. 2, the controller/processor 240 of the BS 110a has a HARQ component 160, which is configured to implement one or more techniques described herein for maintaining a number of HARQ processes below a supported number of HARQ processes, according to aspects described herein. Similarly, the controller/processor 280 and/or other processors and modules at the UE 120a may perform or direct the execution of processes for the techniques described herein. For example, as shown in FIG. 2, the controller/processor 280 of the UE 120a has a HARQ component 170, which is configured to implement one or more techniques described herein for maintaining a number of HARQ processes below a supported number of HARQ processes, according to aspects described herein. Although shown at the Controller/Processor, other components of the UE 120a and BS 110a may be used performing the operations described herein.

As noted, in some systems, communications may be supported in operating bands located in different frequency ranges, which may have different numerologies. For example, CCs in FR1 may use a 15 kilohertz (kHz) or 30 kHz subcarrier spacing and CCs in FR2 may use a 60 kHz, 120 kHz, or 240 kHz subcarrier spacing. For some numerology combinations of CCs aggregated across FR1 and FR2, the number of HARQ processes that result from the particular numerology combination can exceed the maximum number of supported HARQ processes by the communication system.

Figure 3:
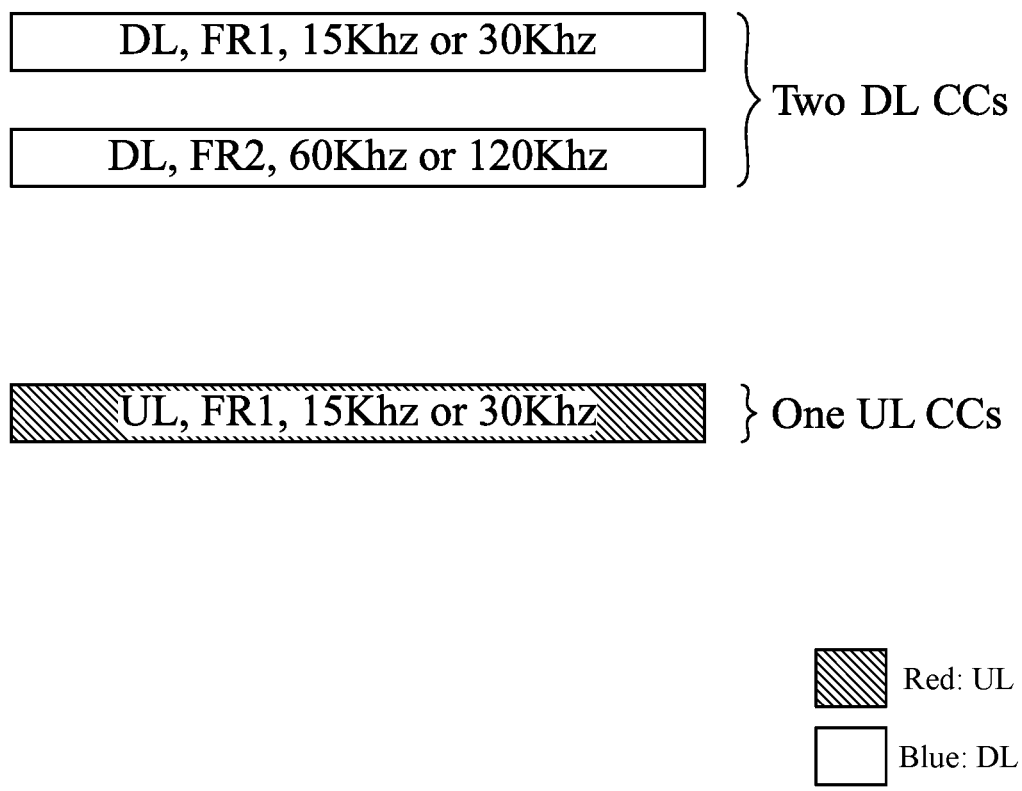
FIG. 3 shows a reference example of a carrier aggregation scenario with different numerologies used by component carriers, in accordance with certain aspects of the present disclosure.

FIG. 3, in particular, shows one reference example of CA scenario in which the different numerologies used by CCs in FR1 and CCs in FR2 results in a number of HARQ processes that exceeds the supported number of HARQ processes in NR. In the CA scenario depicted in FIG. 3, two downlink CCs are aggregated with a single uplink CC. The downlink CCs include a FR1 CC (with a 15 kHz or 30 kHz subcarrier spacing) and a FR2 CC (with a 60 kHz or 120 kHz subcarrier spacing). The uplink CC includes a FR1 CC (with a 15 kHz or 30 kHz subcarrier spacing). In one aspect, the uplink FR1 CC may use the same subcarrier spacing as the downlink FR1 CC. In this particular CA scenario, there may a single PUCCH group configured for the three CCs (e.g., downlink FR1 CC, downlink FR2 CC, and uplink FR1 CC) on the uplink FR1 CC. That is, HARQ feedback (e.g., ACK/NACK) for data (e.g., physical downlink shared channel (PDSCH)) received on the downlink FR1 CC and/or downlink FR2 CC may be transmitted on the uplink FR1 CC.

Figure 4:
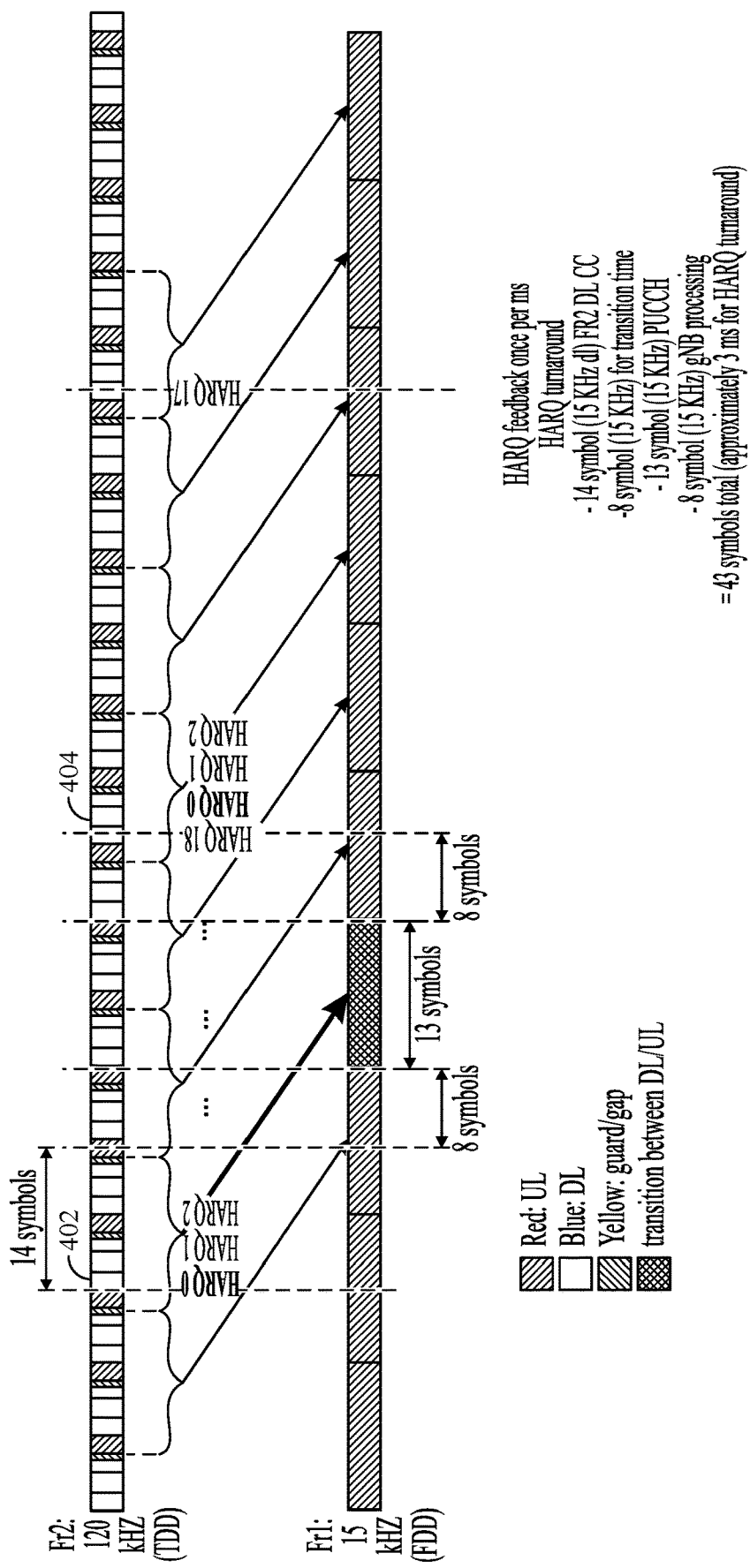
FIG. 4 shows a reference example of a number of HARQ processes exceeding a supported number of HARQ processes, in accordance with certain aspects of the present disclosure.

However, due in part to the numerology combination used by the downlink FR2 CC and the uplink FR1 CC, the resulting number of HARQ processes that may be needed to support the particular CA scenario may exceed the supported number of HARQ processes in NR. For example, as shown in FIG. 4, assume that the downlink FR2 CC (e.g., in FIG. 3) is a time division duplexed (TDD) CC that uses a 120 kHz subcarrier spacing and that the uplink FR1 CC (e.g., in FIG. 3) is a frequency division duplexed (FDD) CC that uses a 15 kHz subcarrier spacing. In this example, eight slots in the downlink FR2 CC may be approximately equivalent to a single slot in the uplink FR1 CC. Also, in this example, the downlink FR2 CC uses a "DDSU" configuration for every four slots, where D is for downlink, S is for special symbol, and U is for uplink. Note, however, that is merely a reference example and that the techniques presented herein can use other slot configurations.

Referring to FIG. 4, assume that a gNB schedules a data transmission (e.g., PDSCH) in each slot (e.g., starting with slot 402), where each data transmission is associated with a different HARQ process ID, then HARQ feedback may be transmitted once per millisecond (ms). However, in this example, there may be an approximately three ms HARQ turnaround time before the gNB is able to schedule another data transmission using a same HARQ process ID. That is, in FIG. 4, there may be an approximately three ms HARQ turnaround time between a downlink transmission (with HARQ process ID 0) scheduled in slot 402 and a downlink transmission (with HARQ process ID 0) scheduled in slot 404. The HARQ turnaround time may be based on the downlink transmission time (e.g., by the gNB), the transition time between the downlink transmission and the HARQ feedback transmission, the HARQ feedback transmission time, and the processing time (e.g., by the gNB) to process the HARQ feedback transmission. In this particular example, the three ms HARQ turnaround time is due to a fourteen symbol (e.g., using the FR1 numerology) downlink transmission time, an eight symbol delay (or transition time) between the downlink transmission (on the downlink FR2 CC) and the HARQ feedback transmission (on the uplink FR1 CC), a thirteen symbol HARQ feedback transmission time, and an eight symbol processing time for the gNB to process the HARQ feedback transmission, for a total of 43 symbols (or approximately 3 ms). As shown in FIG. 4, because of this HARQ turnaround time, this particular CA scenario may have to use nineteen HARQ processes before the same HARQ process is reused. NR, however, may support sixteen HARQ processes for a given CA scenario.

Figure 5:
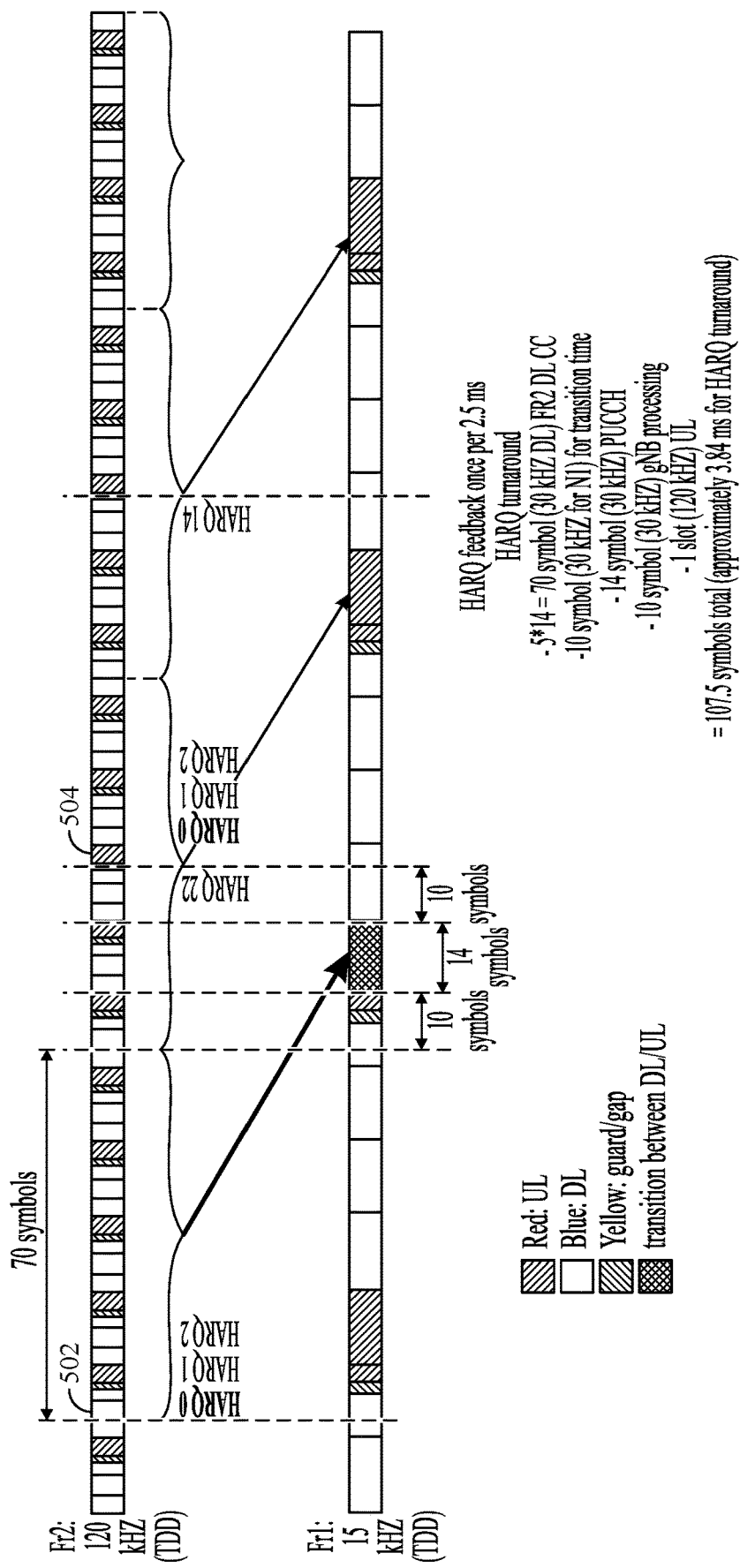
FIG. 5 shows another reference example of a number of HARQ processes exceeding a supported number of HARQ processes, in accordance with certain aspects of the present disclosure.

FIG. 5 shows another reference example in which, due in part to the numerology combination used by the downlink FR2 CC and the uplink FR1 CC, the resulting number of HARQ processes that may be needed to support the particular CA scenario may exceed the supported number of HARQ processes in NR. For example, as shown in FIG. 5, assume that the downlink FR2 CC (e.g., in FIG. 3) is a TDD CC that uses a 120 kHz subcarrier spacing and that the uplink FR1 CC (e.g., in FIG. 3) is a TDD CC that uses a 30 kHz subcarrier spacing. In this example, assuming that a gNB schedules a data transmission (e.g., PDSCH) in each slot (e.g., starting with slot 502), where each data transmission is associated with a different HARQ process ID, then HARQ feedback may be transmitted once per 2.5 ms. However, in this example, there may be an approximately 3.84 ms HARQ turnaround time before the gNB is able to schedule another data transmission using a same HARQ process ID (e.g., HARQ process ID 0 in slot 504).

In this particular example, the 3.84 ms HARQ turnaround time is due to a 70 symbol (e.g., using the FR1 numerology) downlink transmission time, a 10 symbol delay (or transition time) between the downlink transmission (on the downlink FR2 CC) and the HARQ feedback transmission (on the uplink FR1 CC), a 14 symbol HARQ feedback transmission time, a 10 symbol processing time for the gNB to process the HARQ feedback transmission, and a 1 slot (using 120 kHz numerology) uplink processing time, for a total of 107 symbols (or approximately 3.84 ms). As shown in FIG. 5, because of this HARQ turnaround time, this particular CA scenario may have to use 23 HARQ processes before the same HARQ process is reused. NR, however, may support 16 HARQ processes for a given CA scenario.

Accordingly, it may be desirable to provide techniques that allow devices to maintain the number of HARQ processes below the supported number of HARQ processes in particular FR1+FR2 CA scenarios.

Example Techniques to maintain HARQ processes in FR1+FR2 CA

Aspects of the present disclosure provide techniques for maintaining HARQ processes below a supported number of HARQ processes (e.g., for 5G NR) in NR FR1 and FR2 carrier aggregation scenarios. In particular, aspects enable a shorter PUCCH (e.g., spanning a reduced number of symbols relative to a number of symbols for PUCCH used in conventional 5G NR systems) to be used to transmit HARQ feedback. In one aspect, the shorter (or reduced) PUCCH may span 6 or 7 symbols. In one aspect, the shorter (or reduced) PUCCH may span 1 or 2 symbols.

Figure 6:
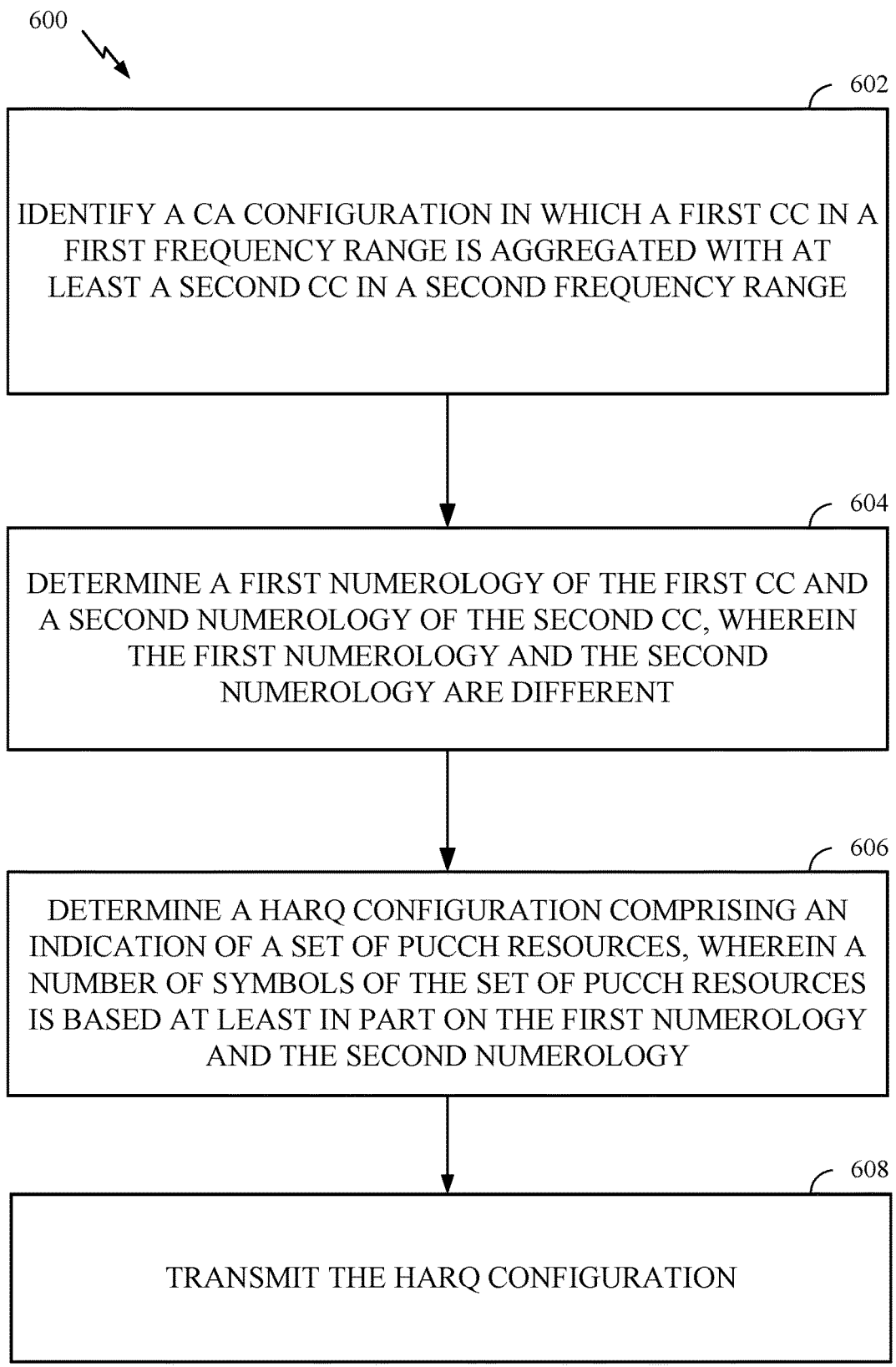
FIG. 6 is a flow diagram illustrating example operations for wireless communication by a UE, in accordance with certain aspects of the present disclosure.

FIG. 6 is a flow diagram illustrating example operations 600 for wireless communication, in accordance with certain aspects of the present disclosure. The operations 600 may be performed, for example, by a network entity (e.g., gNB, such as the BS 110a in the wireless communication network 100). Operations 600 may be implemented as software components that are executed and run on one or more processors (e.g., controller/processor 240 of FIG. 2). Further, the transmission and reception of signals by the BS in operations 600 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 600 may begin, at 602, where the network entity identifies a CA configuration in which a first CC/cell in a first frequency range is aggregated with at least a second CC/cell in a second frequency range. At 604, the network entity determines a first numerology of the first CC/cell and a second numerology of the second CC/cell, where the first numerology and the second numerology are different. At 606, the network entity, determines a HARQ configuration comprising an indication of a set of PUCCH resources, wherein a number of symbols of the set of PUCCH resources is based at least in part on the first numerology and the second numerology. At 608, the network entity transmits the HARQ configuration (e.g., to a UE).

Figure 7:
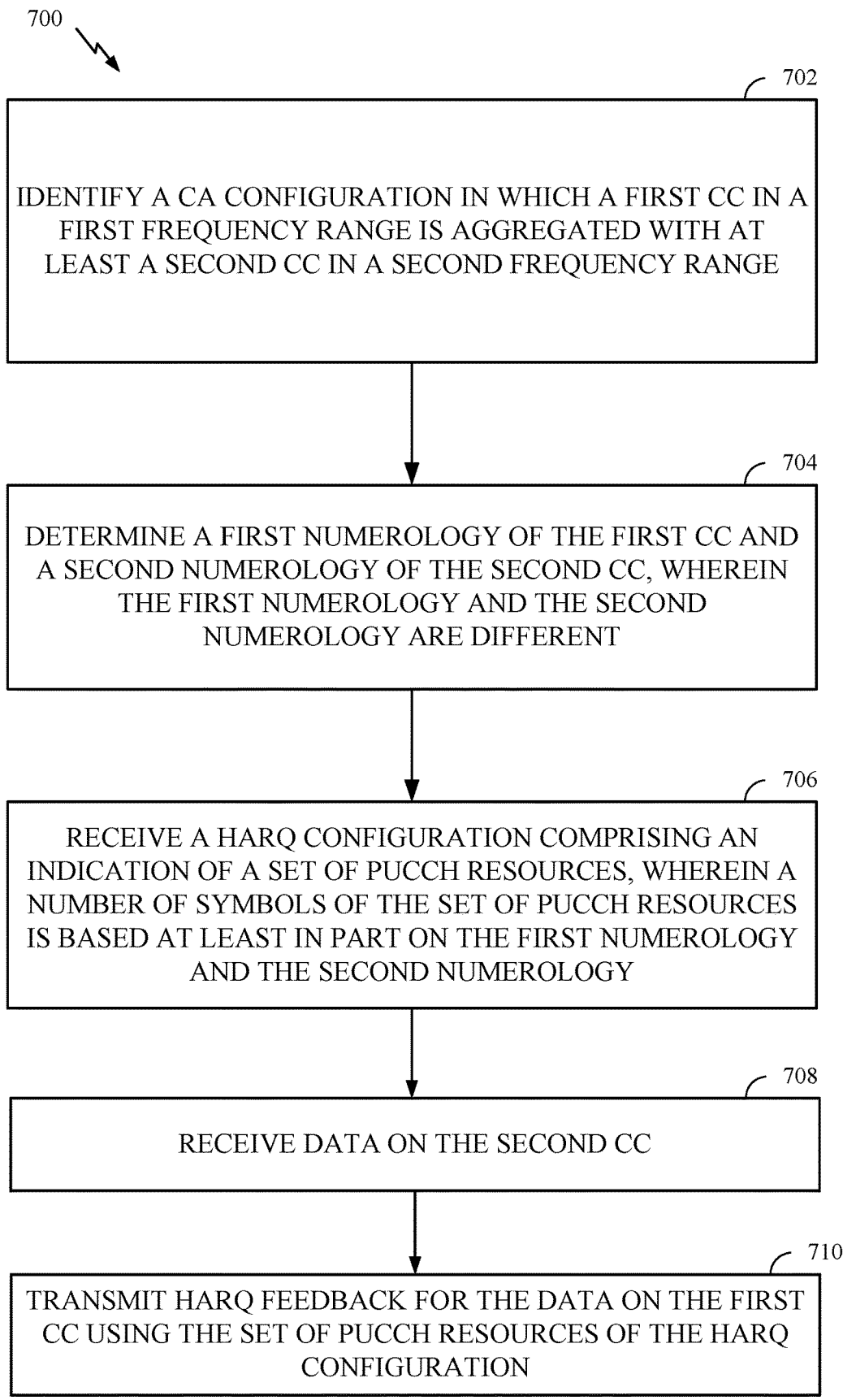
FIG. 7 is a flow diagram illustrating example operations for wireless communication by a BS, in accordance with certain aspects of the present disclosure.

FIG. 7 is a flow diagram illustrating example operations 700 for wireless communication, in accordance with certain aspects of the present disclosure. The operations 700 may be performed, for example, by UE (e.g., such as a UE 120a in the wireless communication network 100). The operations 700 may be complimentary operations by the UE to the operations 600 performed by the BS. Operations 700 may be implemented as software components that are executed and run on one or more processors (e.g., controller/processor 280 of FIG. 2). Further, the transmission and reception of signals by the UE in operations 700 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 700 may begin, at 702, where the UE identifies a CA configuration in which a first CC in a first frequency range is aggregated with at least a second CC in a second frequency range. At 704, the UE determines a first numerology of the first CC and a second numerology of the second CC, where the first numerology and the second numerology are different. At 706, the UE receives a HARQ configuration comprising an indication of a set of PUCCH resources, wherein a number of symbols of the set of PUCCH resources is based at least in part on the first numerology and the second numerology. At 708, the UE receives data on the second CC in the second frequency range. At 710, the UE transmits HARQ feedback for the data received on the second CC on the first CC using the set of PUCCH resources of the HARQ configuration.

In some aspects, the gNB may configure (e.g., on a per UE basis) a shorter PUCCH to be used for transmitting HARQ feedback. For example, the gNB may configure shorter (or reduced) PUCCH resources for each UE and schedule the UEs to use the shorter PUCCH resources to transmit HARQ feedback. In one aspect, the UE may be configured to transmit HARQ feedback in a 7 symbol PUCCH, e.g., in order to reduce the number of HARQ processes below or equal to maximum number of HARQ processes. In one aspect, the UE may be configured to transmit HARQ feedback in a 6 symbol PUCCH (e.g., assuming one symbol of the PUCCH is used for SRS transmission).

In one aspect, the gNB may determine the particular HARQ configuration (e.g., 6 symbol PUCCH, 7 symbol PUCCH, 1 symbol PUCCH, 2 symbol PUCCH, etc.) to use based on the particular numerology combination of the aggregated CCs. For example, assuming a downlink FR2 CC with 120 kHz subcarrier spacing and a uplink FR1 CC with 15 kHz subcarrier spacing are aggregated, the gNB may configure a 6 symbol (assuming SRS is present) or a 7 symbol (e.g., without SRS) PUCCH in order to reduce the number of HARQ processes. In another example, assuming a downlink FR2 CC with 120 kHz subcarrier spacing and a uplink FR1 CC with 30 kHz subcarrier spacing are aggregated, the gNB may also configure a 6 symbol (assuming SRS is present) or a 7 symbol (e.g., without SRS) PUCCH in order to reduce the number of HARQ processes. In some aspects, the gNB may configure a PUCCH with a smaller number of symbols (than 6 or 7 symbols). For example, in some cases, the gNB may configure a 1 symbol or 2 symbol PUCCH in order to reduce the number of HARQ processes. In general, the gNB may configure a PUCCH that spans any number of symbols, based on the given numerology used by the different aggregated CCs, in order to reduce the number of HARQ processes.

Figure 8:
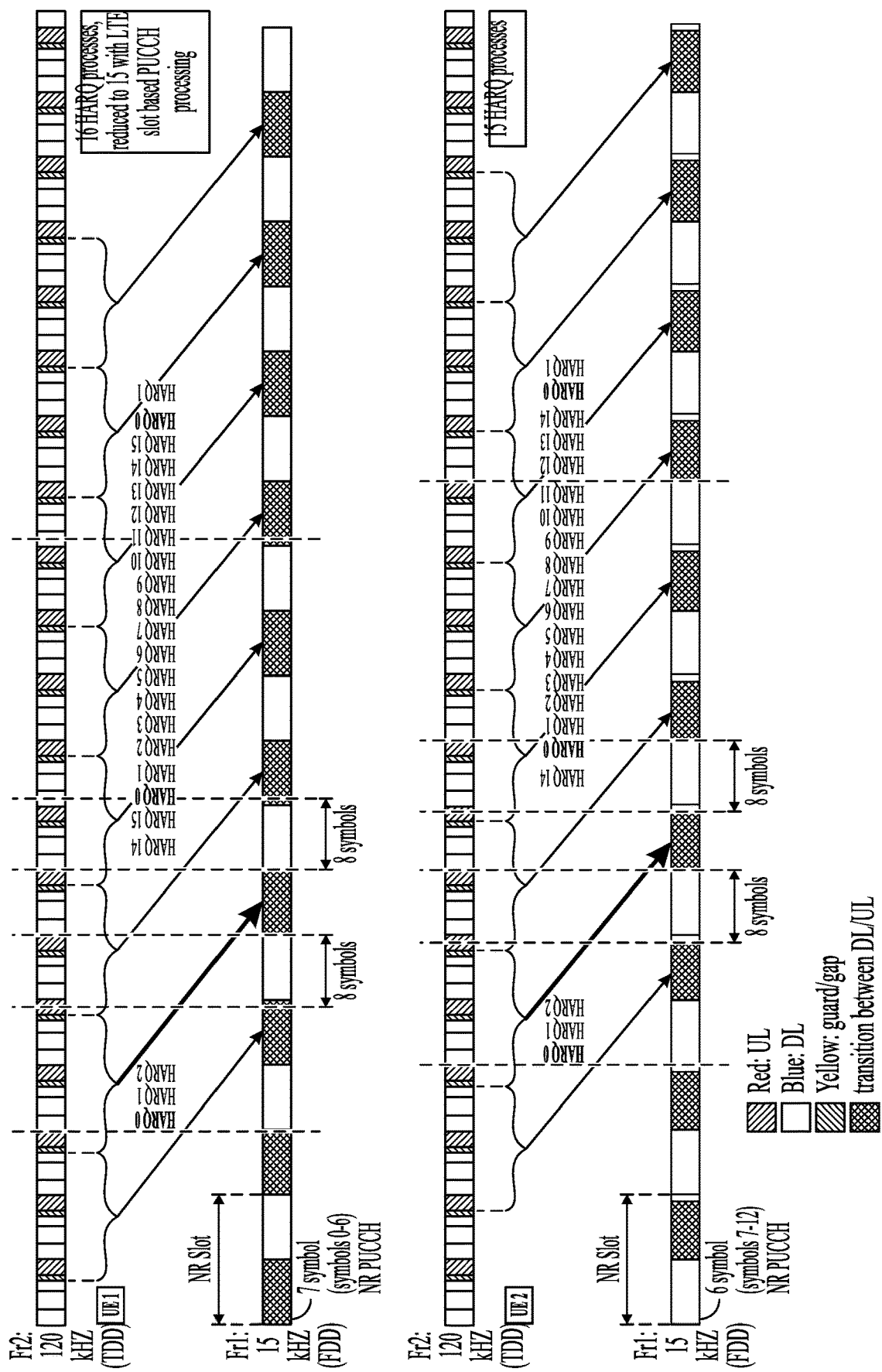
FIG. 8 shows an example HARQ configuration for multiple UEs, in accordance with certain aspects of the present disclosure.

In some aspects, the gNB may group NR UEs into multiple groups and stagger the groups in TDM fashion (e.g., in a single slot), in order to reduce the number of HARQ processes. FIG. 8 shows one reference example in which two UEs are allocated to two different groups, where each group uses a different HARQ configuration. Here, a downlink FR2 CC with 120 kHz subcarrier spacing is aggregated with a uplink FR1 CC with 15 kHz subcarrier spacing. The downlink FR2 CC may be a NR CC and the uplink FR1 CC may be a NR CC. The uplink FR1 CC may be shared between LTE UEs and NR UEs (from the network perspective), where the LTE UE is using separate PUCCH resources in frequency domain from NR UEs. Note that in FIG. 8, only the PUCCH transmissions for NR UEs are shown. In particular, as shown, the NR UE1 is configured to use a 7 symbol PUCCH to transmit HARQ feedback during a first half slot (symbols 0 to 6) of a given NR slot (e.g., in FR1 numerology) and NR UE2 is configured to use a 6 symbol PUCCH to transmit HARQ feedback during a second, subsequent half slot (symbols 7-12) of the same given NR slot. In this manner, the gNB can reduce the number of HARQ processes to 15, below the maximum number of HARQ processes supported in NR.

Figure 9:
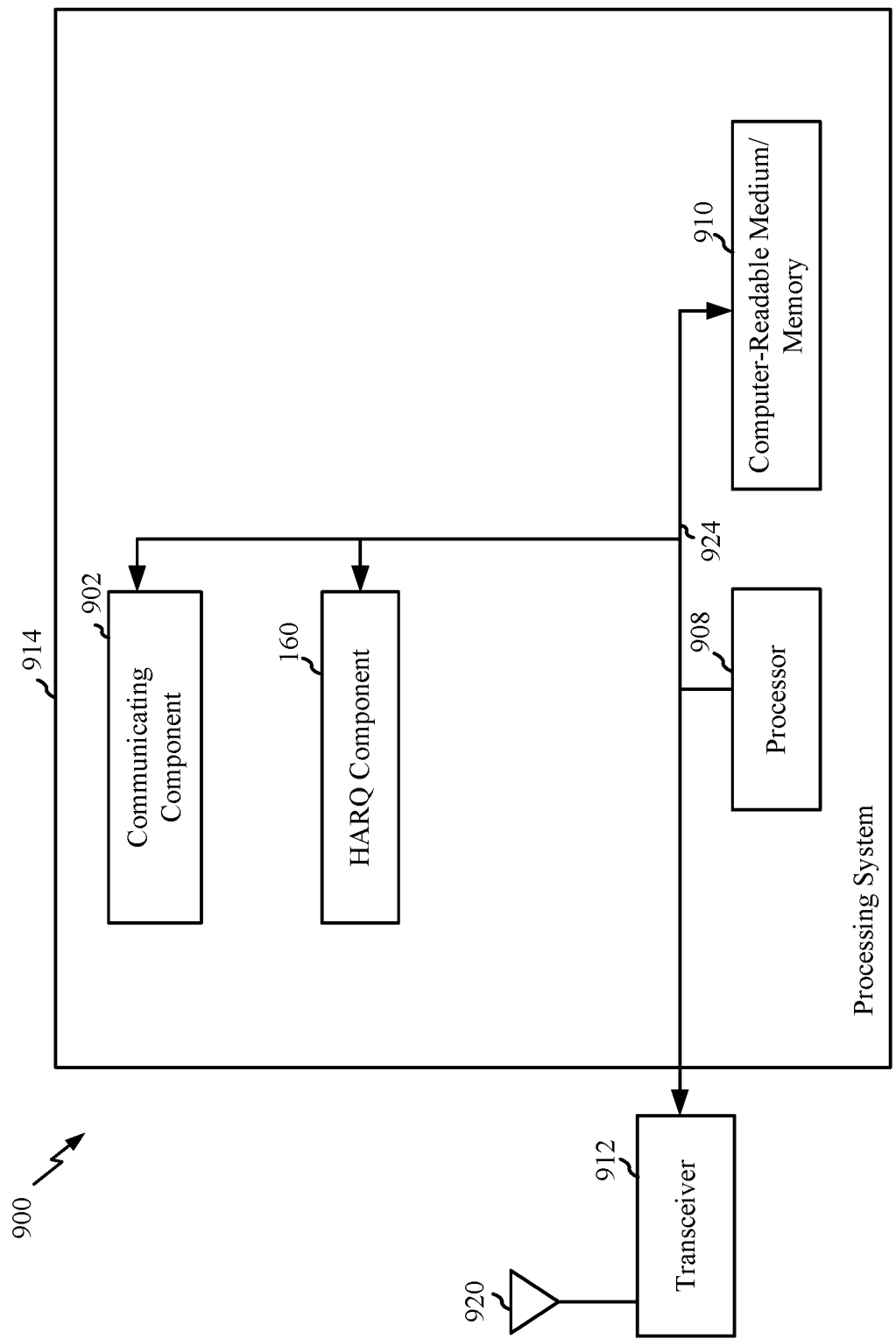
FIG. 9 illustrates a communications device that may include various components configured to perform operations for the techniques disclosed herein, in accordance with aspects of the present disclosure.

FIG. 9 illustrates a communications device 900 that may include various components (e.g., corresponding to means-plus-function components) configured to perform operations for the techniques disclosed herein, such as the operations illustrated in FIG. 6. The communications device 900 includes a processing system 914 coupled to a transceiver 912. The transceiver 912 is configured to transmit and receive signals for the communications device 900 via an antenna 920, such as the various signals described herein. The processing system 914 may be configured to perform processing functions for the communications device 900, including processing signals received and/or to be transmitted by the communications device 900.

The processing system 914 includes a processor 908 coupled to a computer-readable medium/memory 910 via a bus 924. In certain aspects, the computer-readable medium/memory 910 is configured to store instructions that when executed by processor 908, cause the processor 908 to perform the operations illustrated in FIG. 6 and/or other operations for performing the various techniques discussed herein.

In certain aspects, the processing system 914 further includes a communicating component 902 for performing the operations illustrated at 608 in FIG. 6 and/or other communication operations described herein. Additionally, the processing system 914 includes a HARQ component 160 for performing the operations illustrated at 602-606 in FIG. 6 and/or operations described herein. The communicating component 902 and HARQ component 160 may be coupled to the processor 908 via bus 924. In certain aspects, the communicating component 902 and HARQ component 160 may be hardware circuits. In certain aspects, the communicating component 902 and HARQ 160 may be software components that are executed and run on processor 908.

Figure 10:
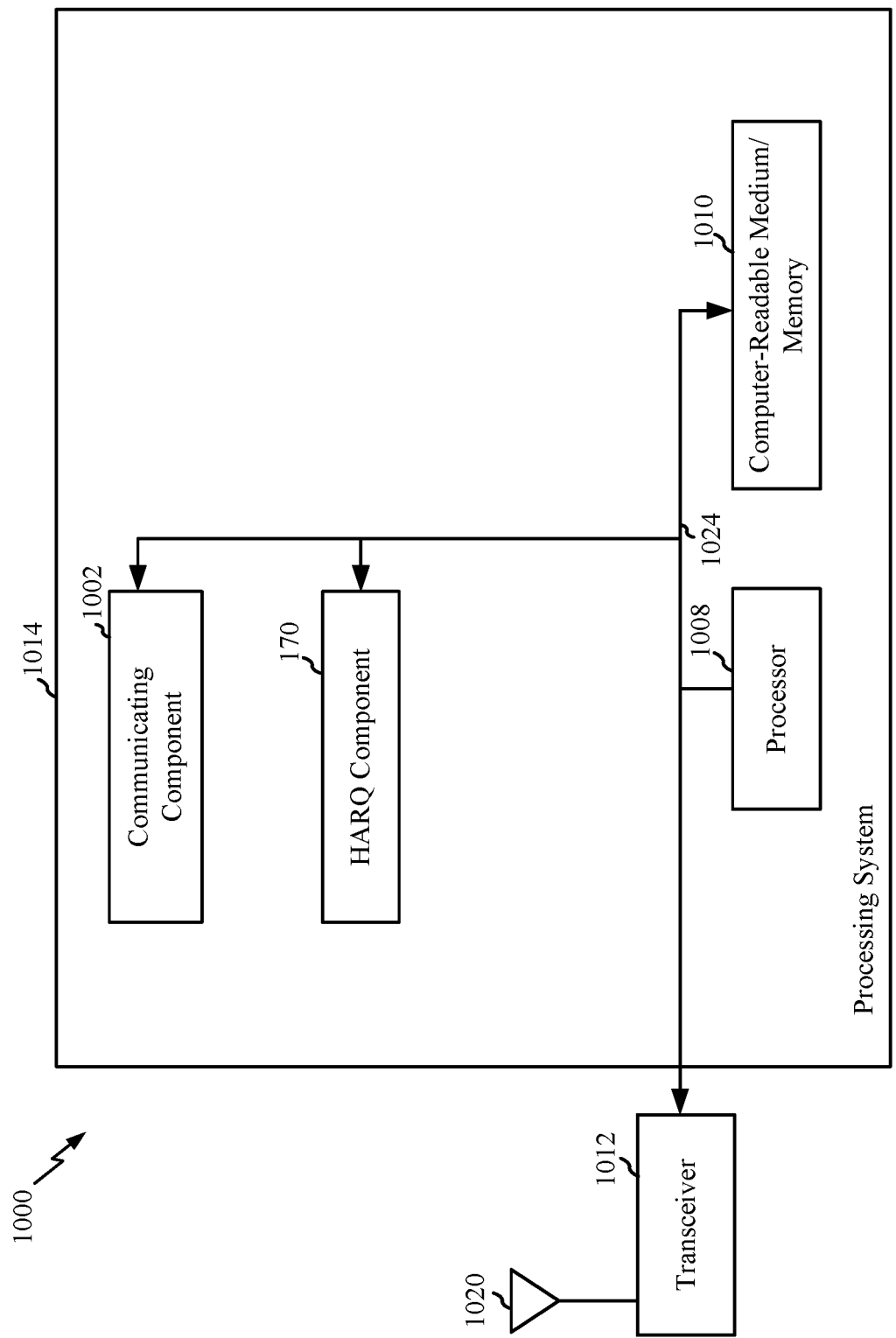
FIG. 10 illustrates a communications device that may include various components configured to perform operations for the techniques disclosed herein, in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIG. 7. The communications device 1000 includes a processing system 1014 coupled to a transceiver 1012. The transceiver 1012 is configured to transmit and receive signals for the communications device 1000 via an antenna 1020, such as the various signals described herein. The processing system 1014 may be configured to perform processing functions for the communications device 1000, including processing signals received and/or to be transmitted by the communications device 1000.

The processing system 1014 includes a processor 1008 coupled to a computer-readable medium/memory 1010 via a bus 1024. In certain aspects, the computer-readable medium/memory 1010 is configured to store instructions that when executed by processor 1008, cause the processor 1008 to perform the operations illustrated in FIG. 7 and/or other operations for performing the various techniques discussed herein.

In certain aspects, the processing system 1014 further includes a communicating component 1002 for performing operations 706-710 in FIG. 7 and/or other communication operations described herein. Additionally, the processing system 1014 includes a HARQ 170 for performing the operations illustrated at 702-704 in FIG. 7 and/or operations described herein. The communicating component 1002 and HARQ component 170 may be coupled to the processor 1008 via bus 1024. In certain aspects, the communicating component 1002 and HARQ component 170 may be hardware circuits. In certain aspects, the communicating component 1002 and HARQ component 170 may be software components that are executed and run on processor 1008.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 kHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 6 and/or FIG. 7.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a network entity in a communication system, comprising:
   identifying a carrier aggregation (CA) configuration in which at least a first component carrier (CC) in a first frequency range is aggregated with at least a second CC in a second frequency range;
   determining a first numerology of the first CC and a second numerology of the second CC, wherein a first number of hybrid automatic repeat request (HARQ) processes that results from a combination of the first numerology of the first CC and the second numerology of the second CC is (i) greater than a predetermined number of HARQ processes for the communication system and (ii) based on an amount of time that has to elapse, after a first transmission is scheduled on the first CC or the second CC, before a second transmission can be scheduled on the first CC or the second CC using a same HARQ process identifier as the first transmission;
   determining a HARQ configuration comprising an indication of a set of physical uplink control channel (PUCCH) resources, wherein a number of symbols of the set of PUCCH resources (i) is based at least in part on the first numerology and the second numerology and (ii) is associated with a second number of HARQ processes that is less than or equal to the predetermined number of HARQ processes for the communication system; and
   transmitting the HARQ configuration.

2. The method of claim 1, wherein the first CC is an uplink CC and the second CC is a downlink CC.

3. The method of claim 2, wherein the first numerology comprises a first subcarrier spacing and the second numerology comprises a second different subcarrier spacing.

4. The method of claim 3, wherein the first subcarrier spacing is 15 kilohertz (kHz) and the second subcarrier spacing is 120 kHz.

5. The method of claim 3, wherein the first subcarrier spacing is 30 kilohertz (kHz) and the second subcarrier spacing is 120 kHz.

6. The method of claim 3, wherein the number of symbols of the set of PUCCH resources is six symbols.

7. The method of claim 3, wherein the number of symbols of the set of PUCCH resources is seven symbols.

8. The method of claim 3, wherein the number of symbols of the set of PUCCH resources is one symbol.

9. The method of claim 3, wherein the number of symbols of the set of PUCCH resources is two symbols.

10. The method of claim 1, wherein determining the HARQ configuration comprises determining a different HARQ configuration for each of a plurality of user equipment (UE) groups, wherein each UE group comprises one or more UEs.

11. The method of claim 10, wherein the HARQ configuration for at least a first UE group comprises a set of PUCCH resources that are time division multiplexed with a set of PUCCH resources for at least a second UE group.

12. An apparatus for wireless communication in a communication system, comprising:
    at least one processor configured to:
      identify a carrier aggregation (CA) configuration in which at least a first component carrier (CC) in a first frequency range is aggregated with at least a second CC in a second frequency range;
      determine a first numerology of the first CC and a second numerology of the second CC, wherein a first number of hybrid automatic repeat request (HARQ) processes that results from a combination of the first numerology of the first CC and the second numerology of the second CC is (i) greater than a predetermined number of HARQ processes for the communication system and (ii) based on an amount of time that has to elapse, after a first transmission is scheduled on the first CC or the second CC, before a second transmission can be scheduled on the first CC or the second CC using a same HARQ process identifier as the first transmission; and
      determine a HARQ configuration comprising an indication of a set of physical uplink control channel (PUCCH) resources, wherein a number of symbols of the set of PUCCH resources (i) is based at least in part on the first numerology and the second numerology and (ii) is associated with a second number of HARQ processes that is less than or equal to the predetermined number of HARQ processes for the communication system;
    a transmitter configured to transmit the HARQ configuration; and
    a memory coupled to the at least one processor.

13. The apparatus of claim 12, wherein the first CC is an uplink CC and the second CC is a downlink CC.

14. The apparatus of claim 13, wherein the first numerology comprises a first subcarrier spacing and the second numerology comprises a second different subcarrier spacing.

15. The apparatus of claim 14, wherein the number of symbols of the set of PUCCH resources is one symbol, two symbols, six symbols, or seven symbols.

16. A method for wireless communication by a user equipment (UE) in a communication system, comprising:
    identifying a carrier aggregation (CA) configuration in which at least a first component carrier (CC) in a first frequency range is aggregated with at least a second CC in a second frequency range;
    determining a first numerology of the first CC and a second numerology of the second CC, wherein a first number of hybrid automatic repeat request (HARQ) processes that results from a combination of the first numerology of the first CC and the second numerology of the second CC is (i) greater than a predetermined number of HARQ processes for the communication system and (ii) based on an amount of time that has to elapse, after a first transmission is scheduled on the first CC or the second CC, before a second transmission can be scheduled on the first CC or the second CC using a same HARQ process identifier as the first transmission;
    receiving a HARQ configuration comprising an indication of a set of physical uplink control channel (PUCCH) resources, wherein a number of symbols of the set of PUCCH resources (i) is based at least in part on the first numerology and the second numerology and (ii) is associated with a second number of HARQ processes that is less than or equal to the predetermined number of HARQ processes for the communication system;
    receiving data on the second CC; and
    transmitting HARQ feedback for the data on the first CC using the set of PUCCH resources of the HARQ configuration.

17. The method of claim 16, wherein the first CC is an uplink CC and the second CC is a downlink CC.

18. The method of claim 17, wherein the first numerology comprises a first subcarrier spacing and the second numerology comprises a second different subcarrier spacing.

19. The method of claim 18, wherein the first subcarrier spacing is 15 kilohertz (kHz) and the second subcarrier spacing is 120 kHz.

20. The method of claim 18, wherein the first subcarrier spacing is 30 kilohertz (kHz) and the second subcarrier spacing is 120 kHz.

21. The method of claim 18, wherein the number of symbols of the set of PUCCH resources is six symbols.

22. The method of claim 18, wherein the number of symbols of the set of PUCCH resources is seven symbols.

23. The method of claim 18, wherein the number of symbols of the set of PUCCH resources is one symbol.

24. The method of claim 18, wherein the number of symbols of the set of PUCCH resources is two symbols.

25. The method of claim 16, wherein the HARQ configuration comprises a set of PUCCH resources that are time division multiplexed with a set of PUCCH resources for at least another UE.

26. An apparatus for wireless communications in a communication system, comprising:
    at least one processor configured to:
        identify a carrier aggregation (CA) configuration in which at least a first component carrier (CC) in a first frequency range is aggregated with at least a second CC in a second frequency range; and
        determine a first numerology of the first CC and a second numerology of the second CC, wherein a first number of hybrid automatic repeat request (HARQ) processes that results from a combination of the first numerology of the first CC and the second numerology of the second CC is (i) greater than a predetermined number of HARQ processes for the communication system and (ii) based on an amount of time that has to elapse, after a first transmission is scheduled on the first CC or the second CC, before a second transmission can be scheduled on the first CC or the second CC using a same HARQ process ID as the first transmission;
    a receiver configured to:
        receive a hybrid automatic repeat request (HARQ) configuration comprising an indication of a set of physical uplink control channel (PUCCH) resources, wherein a number of symbols of the set of PUCCH resources (i) is based at least in part on the first numerology and the second numerology and (ii) is associated with a second number of HARQ processes that is less than or equal to the predetermined number of HARQ processes for the communication system; and
        receive data on the second CC;
    a transmitter configured to transmit HARQ feedback for the data on the first CC using the set of PUCCH resources of the HARQ configuration; and
    a memory coupled to the at least one processor.

27. The apparatus of claim 26, wherein the first CC is an uplink CC and the second CC is a downlink CC.

28. The apparatus of claim 27, wherein the first numerology comprises a first subcarrier spacing and the second numerology comprises a second different subcarrier spacing.

29. The apparatus of claim 28, wherein:
    the first subcarrier spacing is 15 kHz and the second subcarrier spacing is 120 kHz; or
    the first subcarrier spacing is 30 kHz and the second subcarrier spacing is 120 kHz.

30. The apparatus of claim 28, wherein the number of symbols of the set of PUCCH resources is one symbol, two symbols, six symbols, or seven symbols.

* * * * *